(No Model.) 2 Sheets—Sheet 1.

J. R. CLAIR.
TENSION WHEEL.

No. 338,484. Patented Mar. 23, 1886.

Witnesses:
David S. Williams.
William F. Davis

Inventor:
Joshua R. Clair
by his Attorneys
Howson & Son (No Model.)  2 Sheets—Sheet 2.

J. R. CLAIR.
TENSION WHEEL.

No. 338,484.  Patented Mar. 23, 1886.

Witnesses:
David S. Williams.
William F. Davis

Inventor:
Joshua R. Clair
by his Attorneys
Howson & Son

UNITED STATES PATENT OFFICE.

JOSHUA R. CLAIR, OF PHILADELPHIA, PENNSYLVANIA.

TENSION-WHEEL.

SPECIFICATION forming part of Letters Patent No. 338,484, dated March 23, 1886.

Application filed February 1, 1886. Serial No. 190,422. (No model.)

*To all whom it may concern:*

Be it known that I, JOSHUA R. CLAIR, a citizen of the United States, and a resident of Philadelphia, Pennsylvania, have invented certain Improvements in Tension-Wheels, of which the following is a specification.

My invention consists of certain improvements in the construction of that class of wheels in which the tension of the spokes can be adjusted, as fully described hereinafter.

My invention is an application of the tensioning principle set forth in the case of William Zieger, filed January 27, 1886, Serial No. 189,976, in which a pin or projection on the axle or box is combined with a tension device having steps of different heights.

Figure 1:
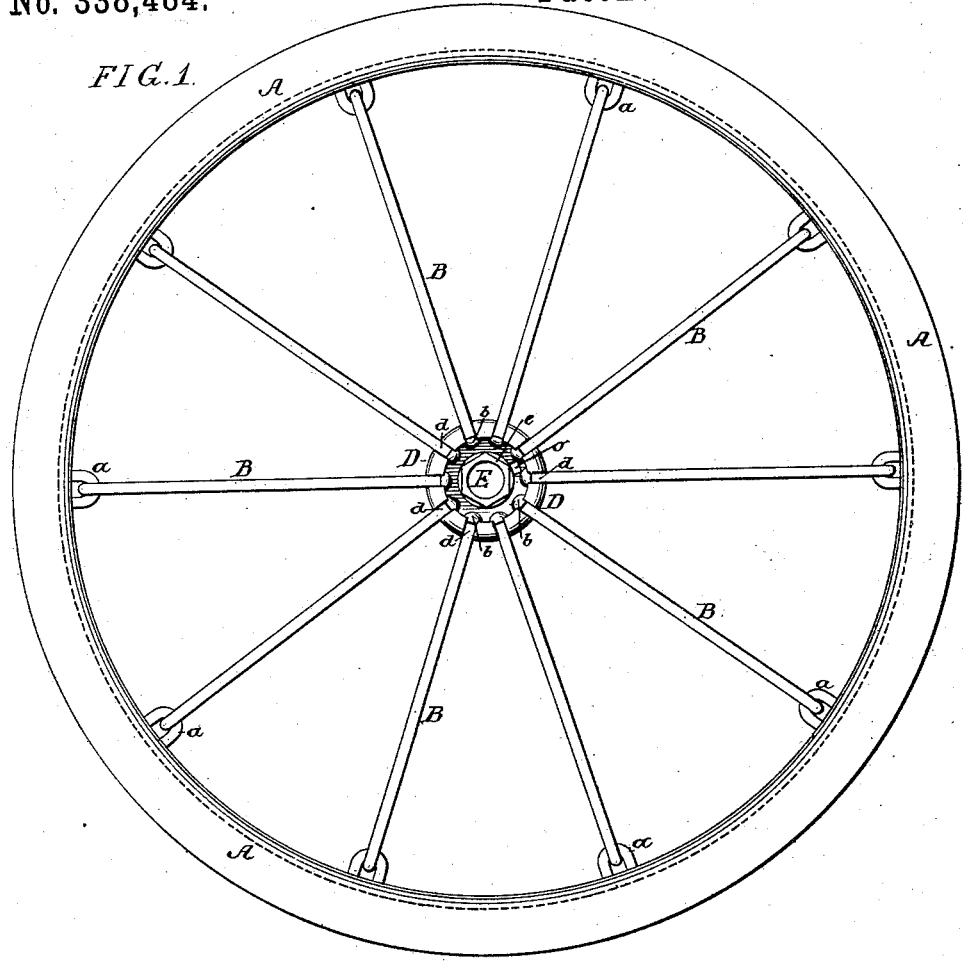
Figure 2:
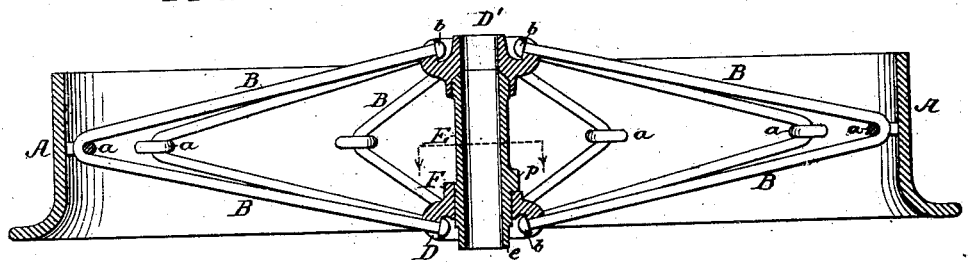
Figure 3:
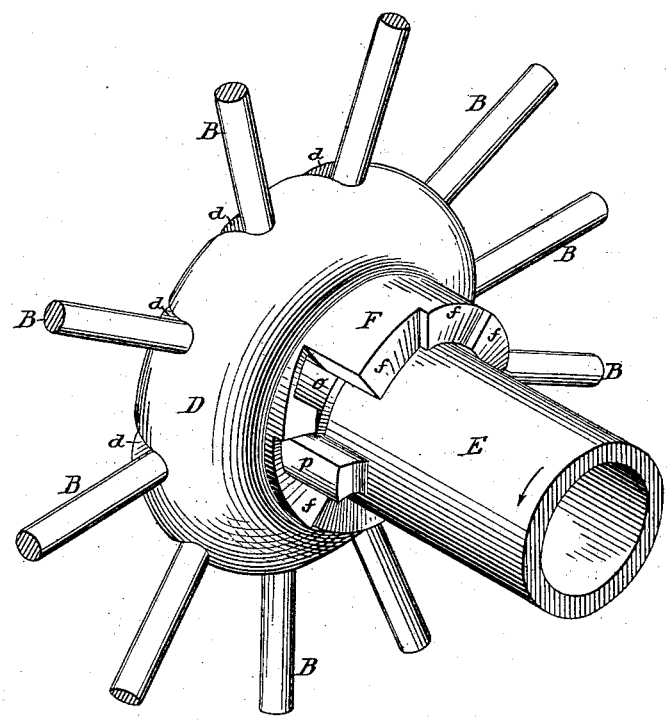

In the accompanying drawings, Figure 1 is a side view of my improved wheel. Fig. 2 is a sectional plan view, and Fig. 3 is a sectional perspective view, of a part drawn to an enlarged scale.

The construction of the tire and the spokes, as well as the manner of connecting the spokes to the adjustable hub, may be varied without departing from my invention, the essential feature of which consists in the combination of devices for adjusting the tension of the spokes. In the present instance I have shown the tire A as flanged and having secured to it, by riveting or otherwise, staples $a$, through which pass the spokes B, of round wire. The ends of the spokes are connected to the two hubs D D' by the headed ends $b$ of the spokes being adapted to notches $d$ in the rimmed flanges of the hubs; but other means for connecting the spokes to the hubs may be adopted, as I have said.

Through the hub D passes the hollow axle-box F, the inner end of which is beveled or coned and adapted to a corresponding seat in the hub D', so that the axle-box can be turned in the two hubs, the outer end of the box being made of a polygonal shape at $e$, (Figs. 1 and 2,) for the application thereto of a tool to turn the box independently of the hubs. On this box E is secured or formed a pin or projection, $p$, which is adapted to bear against the inner stepped face of a nut or sleeve, F, forming part of or secured to the hub D. The steps $f$, which are of different heights and have inclined faces, may be said to be formed on the hub itself, so that by applying a tool to the outer end of the box E, to turn it in the direction of the arrow, Fig. 3, the inner end of the box bearing against the hub D' and the projection $p$ against the hub D will force them apart, and so increase the tension of the spokes, as desired. A notch, $o$, Figs. 1 and 3, is formed within the hub D, for the passage of the pin or projection $p$ on the box E, when the parts are put together.

I claim as my invention—

The combination of the rim and spokes of a wheel and hubs, one of which has steps of different heights, with an axle-box adapted to rotate in the hubs, and having a pin or projection adapted to bear against said steps, substantially as specified.

In testimony whereof I have signed my name to this specification in the presence of two subscribing witnesses.

JOSHUA R. CLAIR.

Witnesses:
 WILLIAM F. DAVIS,
 HARRY SMITH.